Sept. 11, 1928.                    Z. T. MANN                    1,684,040
                                WEEVIL DESTROYER
                              Filed Oct. 8, 1927            2 Sheets-Sheet 2
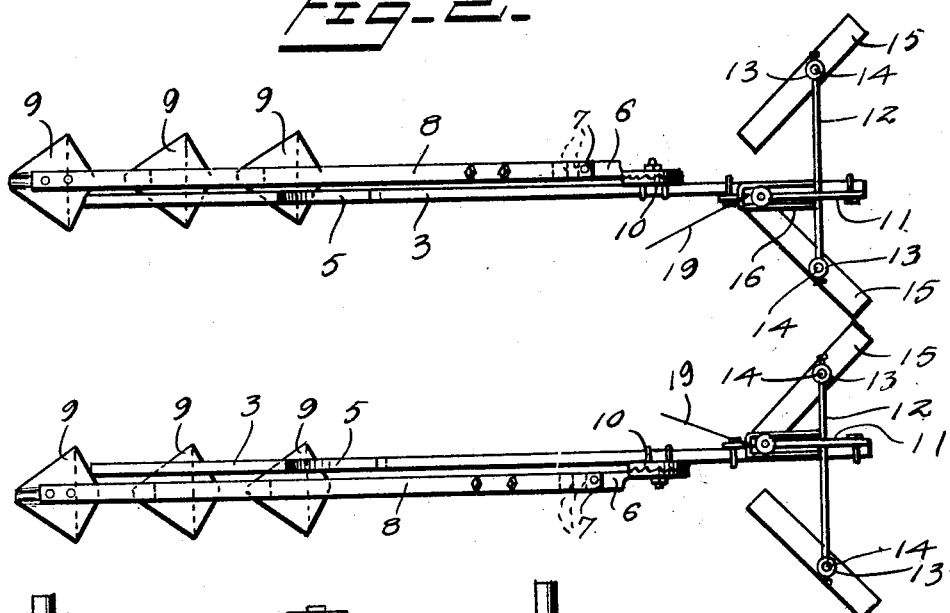
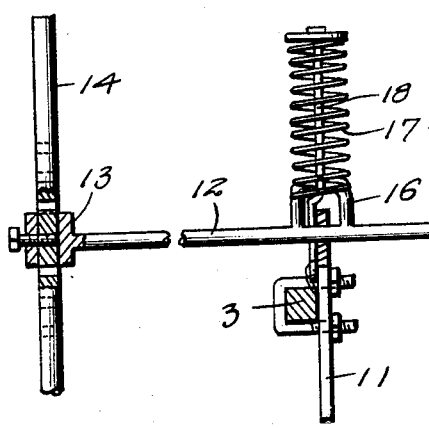
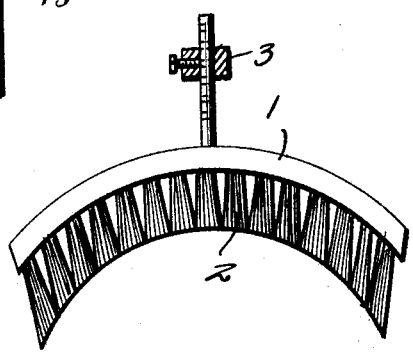
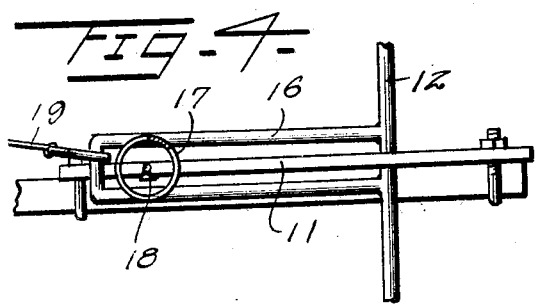
Inventor
Z. T. Mann
By Watson E. Coleman
    Attorney Patented Sept. 11, 1928.

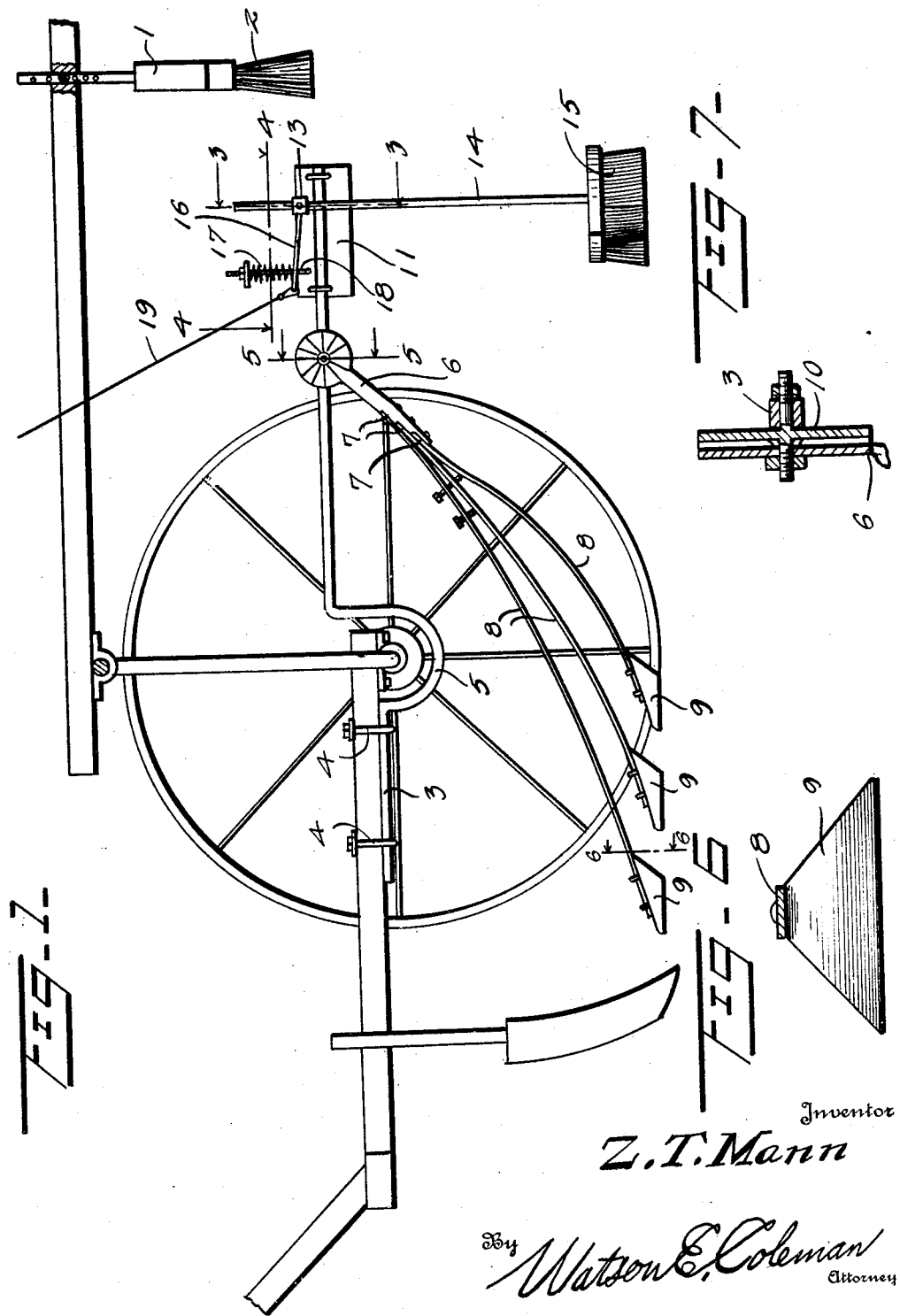

1,684,040

UNITED STATES PATENT OFFICE.

ZOLECTUS T. MANN, OF CAVINESS, TEXAS.

WEEVIL DESTROYER.

Application filed October 8, 1927. Serial No. 224,929.

This invention relates to boll weevil destroyers and it consists in the novel features hereinafter described and claimed.

An object of the invention is to provide a weevil destroyer in the form of an attachment which may be applied to the beam of a cultivator or may be applied to a pivoted beam attached to a wheel mounted frame.

The parts and features of the attachment are so arranged and assembled that as the frame is moved along the row of standing cotton plants, the upper portions of the plants including the bloom or fruit are subjected to brushing action whereby the weevil are dislodged from the plants and knocked to the ground. The weevil are then subjected to the brushing action of stiff brushes which arrange the weevil in rows upon the surface of the ground parallel with the line of travel of the frame. Spring pressed crushers are carried by the frame and move over the rows of weevil and destroy the same.

In the accompanying drawings:—

Figure 1 is a side elevational view of the boll weevil destroyer with parts shown in section;

Figure 2 is a top plan view thereof;

Figure 3 is a fragmentary transverse sectional view thereof cut on the line 3—3 of Figure 1;

Figure 4 is an enlarged fragmentary top plan view of a forward portion of the destroyer;

Figure 5 is a side elevational view of a brush used on the destroyer;

Figure 6 is a fragmentary detailed transverse sectional view of a portion of the destroyer cut on the line 6—6 of Figure 1;

Figure 7 is a detailed transverse sectional view cut on the line 5—5 of Figure 1.

As illustrated in the accompanying drawings, the weevil destroyer comprises an arcuate brush 1 adapted to be applied to the tongue of a wheel mounted frame as for instance a cultivator frame and which is disposed transversely of the line of movement of the frame. The brush 1 is provided with fiber bristles 2 or with relatively soft bristles which are adapted to come in contact with the foliage and blooms or fruit of the plants and knock the same to the ground as the frame moves along the row.

The destroyer also includes side bars 3 having clamps 4 adapted to be used for securing the bars to the beams of the cultivator or frame and the said bars are provided at points between their ends with downwardly curved portions 5 adapted to extend under the axle spindles of the cultivator or frame. Arms 6 are pivotally and adjustably mounted at the forward portions of the bars 3 and the said arms are provided at their free ends with ledges 7. The upper ends of springs 8 rest upon the ledges 7 and are secured thereto. The springs 8 are all different lengths and of different degrees of elasticity. That is to say, the springs are not of the same strength. Crusher plates 9 are carried at the lower ends of the springs 8 and are adapted to travel upon the ground and crush the weevil. Securing devices 10 are provided for holding the arms 6 at desired points and positions upon the bars 3.

Frame plates 11 are mounted upon the forward portions of the bars 3 and shafts 12 are turnably mounted in said plates. Said shafts are provided at their ends with eyes 13 which receive the handles 14 of brushes 15. The brushes 15 have stiff bristles and the brushes are disposed at angles with relation to each other so that the weevil which are knocked from the plants and fall to the ground are engaged by the brushes 15 and moved into lines along the surface of the ground. The crusher plates 9 move over and upon the lines of weevil and crush and destroy the same. The shafts 12 are provided with arms 16 upon which the lower ends of springs 17 bear. The springs 17 are mounted upon rods 18 attached to the plates 11 and serve to hold the rear ends of the arms 16 at lowered positions and whereby the brushes 15 are resiliently held in contact with the surface of the ground. Flexible elements 19 are connected with the rear ends of the arms 16 and may be used for drawing the rear ends of the arms 16 in an upward direction against the tension of the springs 17, thus providing means for swinging the shafts 12 so that the brushes 15 may be raised above the surface of the ground when it is desired to turn the frame around at the end of a row of plants.

The weevil destroyer may be used upon the beams of a cultivator or upon beams of a wheel mounted frame so that the device may be used for destroying the weevil at the time that the crop is being cultivated. As the brushes come in contact with the weevil they are removed from the plants and arranged in rows and the crusher plates destroy the weevil.

The equipment is so constructed that threefourths of the weight of the cultivator or frame may be applied to the crusher plates and thus sufficient pressure is applied to the weevil and to effectually destroy the same.

Having described the invention what is claimed is:—

In a weevil destroying device a bar, an arm adjustably connected with the bar and provided with a plurality of ledges, springs resting upon the ledges of the arm, said springs being of different lengths and different strength, and crusher plates carried at the free ends of the springs.

In testimony whereof I hereunto affix my signature.

ZOLECTUS T. MANN.